United States Patent Office 3,798,114
Patented Mar. 19, 1974

3,798,114
GLASSES WITH HIGH CONTENT OF SILVER OXIDE
Theodor L. Chvatal, Vienna, Austria, assignor to Owens-Illinois, Inc., Toledo, Ohio
No Drawing. Filed May 11, 1971, Ser. No. 142,336
Int. Cl. B32b 15/04
U.S. Cl. 161—191                                        2 Claims

ABSTRACT OF THE DISCLOSURE

Glasses having a high content of silver oxide are described. Generally these glasses contain at least 20%, and up to as high as 70% silver oxide expressed as $Ag_2O$. The glasses also contain a metal oxide of one of the metals, vanadium (V), tungsten (W), molybdenum (Mo), uranium (U) or manganese (Mn), and an oxide of one of the metalloids; viz. boron (B), phosphorous (P), germanium (Ge), arsenic (As), antimony (Sb), bismuth (Bi) or tellurium (Te). Alternatively, the glass may contain in addition to the $Ag_2O$ component, a mixture of oxides of the above transition elements. The glasses are produced by forming a melt using silver in the form of $AgNO_3$ to thereby enable formation of glasses which may have considerable quantities of $Ag_2O$ without precipitating the silver out in the metallic form. The glass compositions are characterized by low melting and low softening temperatures, high density, high refractive index, good infrared transmission characteristics and water resistance. Uses for the glasses include fiber optics, condensers, and glazes for substrates for microelectronic circuits.

---

The present invention relates to novel glasses with a high content of silver oxide and method of manufacturing same. In the prior art, the general teaching with respect to silver or silver oxide is that it may be incorporated into glasses in relatively small amounts. Even photosensitive glasses or opal glasses contain relatively small amounts of silver, seldom exceeding 1%. The present invention, however, permits the formation of glasses having at least 20% $Ag_2O$ and up to as high as 70% $Ag_2O$. These glasses are essentially silica-free and alkali-free.

In accordance with the present invention it is possible to form glasses that have many desirable physical characteristics including relatively low melting and softening temperatures, relatively high dielectric constants, low surface tension and semi-conducting properties. In addition, the glasses in the present application can be heat treated at relatively high temperatures to convert some of the silver present into the metallic state to bring about, for example, a reflecting surface or a conductive surface.

Glasses are amorphous compositions, prepared by super cooling of a glass melt, whereby the transition from the liquid into the solid state has to be reversible. While several different opinions exist on the structure of glasses, it is generally acknowledged that as far as the oxide glasses are concerned they consist mainly of oxygen polyhedra, in the center of which are generally located ions of relatively high charge and relatively small diameter for example $Si^{4+}$, $B^{3+}$, $P^{5+}$, or $Te^{4+}$; these are the so-called glass formers. The polyhedra are mutually connected via all oxygen ions, or via at least two, into a network or into chains. The network possesses an excess of negative charges, which are compensated for by network modifiers, that is, metal ions of relatively small positive charge and relatively large diameters. These network modifiers are preferably the ions of the alkali metals and the alkaline earth metals. Some ions of somewhat smaller diameter and higher charge, for example $Al^{3+}$, can also function as network modifiers, or can be built into the network itself. In the common glasses, the structural characteristics are mainly determined by the glass formers, with network modifiers generally considered as exhibiting a lesser influence on the ultimate nature of the glass.

In the last decade, a completely new group of glasses was found with very interesting properties. See, for example, J. M. Stevels, Philips' Technische Rundschau 22 (1961). These are the so-called "invert" glasses. The specific feature of these glasses is that the volume percentage of oxygen polyhedra is below 50 volume percent, in contrast to the conventional or common glasses where the oxygen polyhedra, together with the glass formers, furnish the main portion of the volume. There are no continuous networks or chains in the invert glasses. Ind glassy state arises on cooling, more particularly by means of a mutual interference of the crystallization. For this purpose at least two network modifiers have to be present, the size and charge of which should be different.

The properties of the invert glasses are dramatically different from the properties of the other glasses. Unlike the case of conventional glasses, in invert glasses the network modifiers have a strong influence on the nature of the glass. These glasses have a more open structure and therefore possess low softening temperatures and high expansion coefficients. They also have relatively low viscosities, steep viscosity curves and low dielectric loss tangents.

It is therefore an object of the present invention to provide new glasses containing silver oxide which have, desirable properties and characteristics.

It is a further object of the present invention to provide a method for making new glasses containing silver oxide.

It is still another object of the present invention to provide products formed from new glasses having a high silver oxide content.

It is a further object of the present invention to provide a new group of glasses with new properties thereby making them suitable for a wide variety of purposes.

In achieving the foregoing objects, one feature of the invention resides in new silica-free glasses in which $Ag_2O$ is present in a relatively large amount, i.e., 20% or more.

In another feature of the invention these new glasses may contain up to 70% $Ag_2O$ and are essentially alkali-free. In the present invention, the $Ag_2O$ where the $Ag^+$ has an ionic radius of 1.26 A. (Pauling), is combined with other metal ions, preferably with metal ions of the so-called metal groups and with another selected metalloid ion. For purposes of this invention, the metal ions of the metal group, V, W, Mo, U and Mn have ionic radii between 0.5 and 0.8 A. These dimensions for ionic radii refer primarily to the highest valence state of these metal elements. In other words, $Ag_2O$ is combined with oxides of metals with a relatively small ionic radius and high valence (at least over 4). The third component of the glass systems of this invention is chosen from the group of metalloids; viz., B, P, Ge, As, Sb, Bi and Te. Here the ionic radii are still smaller and the valences are 3 to 5.

A further feature of the invention resides in novel glass compositions containing at least 20% by weight $Ag_2O$ and 10 to 70% by weight of an oxide of a metal selected from the group consisting of vanadium, tungsten, molybdenum, uranium and manganese and further containing 10 to 70% by weight of an oxide of a metalloid selected from the group consisting of boron, phosphorous, germanium, arsenic, antimony, bismuth and tellurium.

A still further feature of the invention resides in novel glass compositions containing at least 20% by weight $Ag_2O$ and 30% to 80% by weight of a two-component mixture of metalloid oxides wherein the metalloid is selected from the groups consisting of boron, phosphorous, germanium, arsenic, antimony, bismuth and tellurium.

Surprisingly, it has been determined that the glasses of this invention containing up to 70% of $Ag_2O$ are stable in these combinations. In the prior art, it was the common practice to introduce the $Ag_2O$ into glasses only as an addition agent for various functions, for example, as nucleant or as an indicator for ionizing radiation. In other developments, larger amounts of silicon dioxide were present in glass but with limitations on the upper amounts that could be tolerated. In a publication of Provance, J. D., and Wood, D. C., "Molybdenum Phosphate Glasses Containing $Ag_2O$ and $K_2O$," J. Amer. Ceram. Soc. vol. 50 (1967), (10), pp. 516–520, glasses with $Ag_2O$ up to 23 wt. percent are also mentioned. According to the present invention, however, it is possible to produce stable glasses with up to 70 wt. percent $Ag_2O$. The advantages of the present invention are obtained through two means: (1) the choice of the other metal ions in the systems, and (2) the utilization of $AgNO_3$ as raw material for the glasses. It has been determined that $Ag_2O$ forms thermally stable compounds with the oxides of the selected transition metals. In contrast to these stable compounds, all oxide containing compounds of silver, e.g. $Ag_2O$, $AgOH$, $AgCO_3$ and $AgNO_3$, show the tendency to decompose above 300° C., whereby metallic Ag is formed.

Therefore a further feature of the invention resides in the use of silver nitrate as the raw batch material for the formation of $Ag_2O$ in the glass. $AgNO_3$ is very low melting, at approximately 200° C., and serves as an excellent melting aid in the synthesis of glasses of high silver content. By following the procedure of using $AgNO_3$, a melt of good reaction with the other components; viz. good solid-liquid contact is assured. The $Ag_2O$, formed through the reaction of the other components with $AgNO_3$, gradually decompose $AgNO_3$. Traces of $N_2O_5$, however, remain in the melt and counteract the thermal decomposition of $Ag_2O$. In accordance with the invention the melts for synthesis of the glasses may be heated to temperatures up to 1000° C. without reducing the silver to metal.

Another advantage in the use of silver nitrate resides in making possible combinations with other oxides which sublime at low temperatures, for example, combinations with $As_2O_3$, $Sb_2O_3$ and $TeO_2$. Very low melting glasses can be obtained with these glass formers.

Finally, it has been determined that the $AgNO_3$ has yet another function. If oxides of the transition metals are to form glasses, then the ions should be present in their highest valence, because then the requirement of the smallest ion radius and the highest valence is met. In this respect, the silver nitrate melt is very oxidizing and for example, is capable of oxidizing $Mn^{4+}$ to $Mn^{7+}$.

The following ternary glass systems are capable of forming relatively extensive glassy regions as will be apparent from the illustrative compositions:

$$V_2O_5—P_2O_5—Ag_2O$$
$$WO_3—P_2O_5—AgO$$
$$TeO_2—P_2O_5—Ag_2O$$
$$V_2O_5—AsO_3—Ag_2O$$
$$WO_3—As_2O_3—Ag_2O$$
$$MoO_3—As_2O_3—Ag_2O$$
$$TeO_2—As_2O_3—Ag_2O$$
$$Bi_2O_3—B_2O_3—Ag_2O$$
$$GeO_2—B_2O_3—Ag_2O$$
$$TeO_2—B_2O_3—Ag_2O$$

Included in this group of ternary glass systems and illustrative of this invention are the following compositions in weight percent:

| | |
|---|---|
| $V_2O_5$ | 10–70 |
| $P_2O_5$ | 10–40 |
| $Ag_2O$ | 20–70 |
| $WO_3$ | 10–60 |
| $P_2O_5$ | 12–40 |
| $Ag_2O$ | 20–65 |
| $TeO_2$ | 15–65 |
| $P_2O_5$ | 10–40 |
| $Ag_2O$ | 20–70 |
| $V_2O_5$ | 10–60 |
| $As_2O_3$ | 12–40 |
| $Ag_2O$ | 20–60 |
| $WO_3$ | 10–60 |
| $As_2O_3$ | 15–50 |
| $Ag_2O$ | 20–55 |
| $MoO_3$ | 10–60 |
| $As_2O_3$ | 15–35 |
| $Ag_2O$ | 20–60 |
| $TeO_2$ | 10–60 |
| $As_2O_3$ | 10–40 |
| $Ag_2O$ | 20–50 |
| $Bi_2O_3$ | 10–60 |
| $B_2O_3$ | 20–65 |
| $Ag_2O$ | 20–50 |
| $GeO_2$ | 15–55 |
| $B_2O_3$ | 20–50 |
| $Ag_2O$ | 20–45 |
| $TeO_2$ | 10–60 |
| $B_2O_3$ | 15–50 |
| $Ag_2O$ | 20–60 |

In the following ternary glass systems glass forming regions of medium extent were found:

$$U_3O_8—P_2O_5—Ag_2O$$
$$Sb_2O_4—P_2O_5—Ag_2O$$
$$Bi_2O_3—P_2O_5—Ag_2O$$
$$Mn_2O_7—P_2O_5—Ag_2O$$
$$V_2O_5—TeO_2—Ag_2O$$
$$U_3O_8—As_2O_3—Ag_2O$$
$$Mn_2O_7—B_2O_3—Ag_2O$$
$$P_2O_5—B_2O_3—Ag_2O$$

Included within this second group of ternary glass systems and illustrative of the present invention are the following compositions in weight percent:

| | |
|---|---|
| $U_3O_8$ | 20–50 |
| $P_2O_5$ | 22–40 |
| $Ag_2O$ | 20–50 |
| $Sb_2O_4$ | 10–45 |
| $P_2O_5$ | 30–50 |
| $Ag_2O$ | 20–60 |
| $Bi_2O_3$ | 10–45 |
| $P_2O_5$ | 30–45 |
| $Ag_2O$ | 20–60 |
| $Mo_2O_7$ | 10–25 |
| $P_2O_5$ | 35–60 |
| $Ag_2O$ | 20–55 |
| $V_2O_5$ | 15–50 |
| $TeO_2$ | 20–60 |
| $Ag_2O$ | 20–45 |
| $U_3O_8$ | 15–35 |
| $As_2O_3$ | 35–50 |
| $Ag_2O$ | 25–40 |
| $Mn_2O_7$ | 10–20 |
| $B_2O_3$ | 40–60 |
| $Ag_2O$ | 30–45 |
| $P_2O_5$ | 10–20 |
| $B_2O_3$ | 25–40 |
| $Ag_2O$ | 45–60 |

All glasses of the invention possess a common property of relatively low softening temperature. This is primarily affected through the $Ag_2O$, because the latter actually acts in these glasses like an alkali oxide, but has the great advantage over use of alkalies in glasses because $Ag_2O$ is difficult to dissolve in water. This is true not only for $Ag_2O$, but also for the other oxygen containing silver compounds, for example, AgOH. Despite their low softening temperatures, these glasses therefore have a good water and moisture resistance. In addition; there is a good stability against bases (lye) (except ammonia) and also againt HCl.

As will be apparent to persons skilled in the art that the properties of the glasses will vary because of the different possible combinations with ions of the transition metals and also with glass forming ions.

Depending upon the combination of oxides, the novel glasses possess very high specific weights, high refractive indices and, in some cases, very high dielectric constants. These properties are dependent on the atoms, and it is possible to combine with the heavy $Ag^+$ in the glass other atoms of high atomic weight even in larger quantities, for example W, U, Bi, Sb and Te. It generally can be concluded that the glasses of the invention containing $P_2O_5$ and $As_2O_3$ as well as $TeO_2$ as a glass forming oxide have low softening temperatures, low viscosities and relatively steep viscosity curves. In contrast, glasses with $B_2O_3$ as the glass forming oxide show inverse properties, although even here the softening temperatures are relatively low.

Because of their viscosity characteristics the glasses of this invention may be technologically utilized for casting of seed free glasses. With the new glasses of high refractive index new fiber optics can be made. Glasses of low softening temperature, low viscosity, high dielectric constant and high electrical resistivity (for example, glasses in the systems $TeO_2$-$P_2O_5$-$Ag_2O$) can preferably be utilized as a matrix for dispersed $BaTiO_3$ powder. Even matched density and expansion coefficients can be achieved. With this combination parts for substrates for microcircuits or condensers can be fabricated by the glass technologist.

Of particular interest is the ability to markedly reduce the surface tension of the glass melt by the addition of ions of small ionic radius and high valence, and thereby achieve well-adhering, low melting glasses and solder or sealing glasses. It is noteworthy that selected glasses even adhere to and penetrate into graphite. Strong and durable laminates can be made by using the sealing glass compositions according to this invention.

On the other hand, at high temperatures and in contact with metals, the $Ag_2O$ can be reduced to metallic Ag. Thus, silver can diffuse into the metals or can form alloys with the substrate. In this way a good adhesion is achieved even to metals that are hard to glaze, for example, gold.

The thermal expansion coefficient of glasses according to this invention is related to their structure. The coefficient is relatively high and increases as the $Ag_2O$ content is increased. In glasses formed with $P_2O_5$ and $As_2O_3$ as glass formers, the expansion coefficient is higher than with glasses that contain $B_2O_3$ as the glass forming oxide. The expansion coefficient is more similar to that of the metals. Thus, by following the teachings herein, it is possible to produce glasses which are close to metals in thermal expansion characteristics, but which possess an advantage over prior art glasses in that they are stable glasses. High expansion coefficient is often desirable or even necessary for certain applications such as matching metals for bonding to metals. Heretofore, some glasses have been obtained possessing the desired expansion properties by the addition of $Na_2O$ to the glass. Unfortunately, the durability of the glasses is decreased with increasing $Na_2O$ content. With the present invention, however, glasses of good durability and high coefficient of expansion are obtainable.

Since the invention allows for manufacture of glasses of high metal oxide content, it is possible to produce colored glasses, for example by addition $WO_3$, $MoO_3$, $MnO_2$, $U_3O_8$, $TeO_2$ and $Bi_2O_3$, or, by additional of $V_2O_5$, to melt glasses that transmit only in the infrared region.

Especially noteworthy are the electrical properties of the glasses of this invention. The capability of achieving a high dielectric constant has already been pointed out. But also the specific electrical resistance can be widely varied depending upon the composition. Illustratively, it can lie between $10^4$ to $10^{12}$ Ohm-cm., and persons skilled in the art with the information contained herein will be able to tailor the compositions of the glasses for an intended purpose or function.

When $P_2O_5$ and $As_2O_3$ are used as glass formers, an addition of $V_2O_5$, $WO_3$ or $MoO_3$ will affect a strong reduction of electrical resistance, especially in combination with a higher content of $Ag_2O$. Through these combinations the invention affords the production of semi-conducting glasses. The temperature coefficient of the specific electrical resistance is strongly negative. The activation energies, $E_o$, of these semi-conducting glasses are very low and lie between approximately 0.3 to 0.5 ev. Since the crystallization tendency in these semi-conducting glasses of the invention can be more or less pronounced, depending upon composition, it is possible to use them as elements for switching devices; viz. elements for which the resistance changes discontinuously at a certain threshold voltage. Even thin conducting layers can be put on other materials by use of these semi-conducting glasses of this invention.

The following examples are illustrations of how to prepare glasses of the invention:

EXAMPLE 1

88 g. (grams) $AgNO_3$ are mixed dry with 25 g. $V_2O_5$-powder, and are thickened into a paste by adding of 28 g. of a 75% phosphoric acid in a crucible. Then the glass is melted by heating to 800° C. and samples are poured. These are annealed at approximately 180° C. and are slowly cooled. By this procedure a glass of composition—25% $V_2O_5$, 15% $P_2O_5$ and 60% $Ag_2O$, is obtained. This glass is brown-black and non-transparent for visible light.

EXAMPLE 2

73 g. $AgNO_3$ are mixed with 32 g. tungsten oxide, and thickened with a 75% phosphoric acid. After melting at approximately 1000° C. a yellow, translucent glass of the composition—30% $WO_3$, 20% $P_2O_5$ and 50% $Ag_2O$, is obtained. This glass composition is annealed at 300° C.

EXAMPLE 3

54 g. $AgNO_3$ are mixed with 52 g. $TeO_2$ and thickened with 20.5 g. of a 75% phosphoric acid. After melting at 600° C. a yellow glass of the indicated composition is obtained: 52% $TeO_2$, 11% $P_2O_5$, 37% $Ag_2O$. This glass is annealed at 230° C.

EXAMPLE 4

57 g. $AgNO_3$ are mixed with 20 g. $UO_2$ and thickened with 73 g. of a 75% phosphoric acid. After melting at 900° C. a green glass of the composition: 20% $U_3O_8$, 40% $P_2O_5$, 40% $Ag_2O$ is obtained. This glass is tempered at 240° C.

EXAMPLE 5

58 g. $AgNO_3$ are mixed with 20 g. $Bi_2O_3$ and thickened with 73 g. of a 75% phosphoric acid. After melting at 700° C. a yellowish glass of the composition 20% $Bi_2O_3$, 40% $P_2O_5$, 40% $Ag_2O$ is obtained. This glass is annealed at 180° C.

EXAMPLE 6

58 g. $AgNO_3$ are mixed with 30 g. $Sb_2O_3$ and thickened with 55.5 g. of a 75% phosphoric acid. After melting at 900° C., a colorless glass of the composition: 30% $Sb_2O_4$, 30% $P_2O_5$, 40% $Ag_2O$ is obtained. This glass is annealed at 280° C.

EXAMPLE 7

44 g. $AgNO_3$ are mixed with 20 g. $MnO_2$ and thickened with 93 g. of a 75% phosphoric acid. After melting at 950°

C. a violet glass of the composition: 20% $Mn_2O_7$, 50% $P_2O_5$, 30% $Ag_2O$ is obtained. This glass is annealed at 350° C.

EXAMPLE 8

62 g. $AgNO_3$ are dry mixed with 35 g. $V_2O_5$ and 22 g. $As_2O_3$, 50 ml. water is added, dried out, and melting is done at 600° C. A dark brown, opaque glass is obtained which is transparent to IR radiation, and has the composition: 35% $V_2O_5$, 20% $As_2O_3$, 45% $Ag_2O$. This glass is annealed at 190° C.

EXAMPLE 9

81 g. $AgNO_3$ are mixed with 22 g. tungsten oxide and 27 g. $As_2O_3$ as described in Example 8 and melted at 550° C. A reddish-brown glass of the following composition is obtained: 10% $WO_3$, 35% $As_2O_3$, 55% $Ag_2O$. This glass is annealed at 210° C.

EXAMPLE 10

88 g. $AgNO_3$ are mixed with 10 g. $MoO_3$ and 33 g. $As_2O_3$ as described in Example 8 and melted at 500° C. A greenish glass which has the indicated composition: 10% $MoO_3$, 30% $As_2O_3$, 60% $Ag_2O$ is obtained. This glass is annealed at 270° C.

EXAMPLE 11

58 g. $AgNO_3$ are mixed with 30 g. $UO_2$ and 33 g. $As_2O_3$ as described in Example 8 and melted at 550° C. An orange glass of the composition 28% $U_3O_8$, 35% $As_2O_3$, 37% $Ag_2O$ is obtained. This is annealed at 300° C.

EXAMPLE 12

73 g. $AgNO_3$ are mixed with 30 g. $TeO_2$ and 33 g. $As_2O_3$ as described in Example 8 and melted at 400° C. A reddish glass having the composition 30% $TeO_2$, 30% $As_2O_3$, 40% $Ag_2O$ is obtained. This is annealed at 210° C.

EXAMPLE 13

66 g. $AgNO_3$ are mixed with 20 g. $TeO_2$ and 35 g. $V_2O_5$ as described in Example 8 and melted at 500° C. A brown glass of the composition 35% $V_2O_5$, 20% $TeO_2$, 45% $Ag_2O$ is obtained. This glass composition is annealed at 150° C.

EXAMPLE 14

58 g. $AgNO_3$, 20 g. $Bi_2O_3$, and 72 g. $H_3BO_3$ are dry mixed, thickened with 100 ml. $H_2O$, dried out again, and melted at 700° C. One obtains a yellowish glass of the following composition: 20% $Bi_2O_3$, 40% $B_2O_3$, 40% $Ag_2O$. This glass is annealed at 310° C.

EXAMPLE 15

58 g. $AgNO_3$, 20 g. $GeO_2$ and 71 g. $H_3BO_3$ are prepared as in Example 14 and melted at 900° C. One obtains a yellowish glass of the composition 20% $GeO_2$, 40% $B_2O_3$, 40% $Ag_2O$. This glass is annealed at 430° C.

EXAMPLE 16

43 g. $AgNO_3$, 50 g. $TeO_2$ and 53 g. $H_3BO_3$ are prepared as in Example 14 and melted at 600° C. One obtains a yellowish glass of the composition: 40% $TeO_2$, 30% $B_2O_3$, 30% $Ag_2O$. This glass is annealed at 330° C.

EXAMPLE 17

58 g. $AgNO_3$, 15 g. $MnO_2$ and 80 g. $H_3BO_3$ are prepared as in Example 14 and melted at 900° C. One obtains a violet glass of the composition: 15% $Mn_2O_7$, 48% $B_2O_3$, 37% $Ag_2O$. This glass is annealed at 450° C.

EXAMPLE 18

88 g. $AgNO_3$ are mixed dry with 44 g. $H_3BO_3$, and thickened with 28 g. of a 75% $H_3PO_4$. This glass is melted at 800° C. A yellowish glass of the following composition is obtained: 15% $P_2O_5$, 25% $B_2O_3$, 60% $Ag_2O$. This glass is annealed at 380° C.

All the glasses of Examples 1–13 can be melted in unglazed porcelain crucibles, "Pythagoras"-crucibles or corundum crucibles. The borate glasses are somewhat more aggressive and should preferably be made in corundum crucibles.

The following tables contain additional representative glasses of the present invention together with physical property data:

TABLES

Legend for the tables:
  $T_E$ = Softening temperature
  $T_S$ = Melting temperature
  $\rho$ = Specific electrical resistance (ohm·cm.)
  $\alpha$ = Linear coefficient of expansion (cm./cm.· ° C.)
  $\epsilon$ = Dielectric constant

TABLE 1

| Glass $V_2O_5$ | Composition, wt. percent | | | $T_E$, ° C. | $T_S$, ° C. | $\rho$ | $\alpha \times 10^7$ | $\epsilon$ |
|---|---|---|---|---|---|---|---|---|
| | $V_2O_5$ | $P_2O_5$ | $Ag_2O$ | | | | | |
| A | 60 | 10 | 30 | 450 | 620 | $7.1 \times 10^5$ | 138 | |
| B | 56 | 23 | 21 | 250 | 430 | $8.8 \times 10^5$ | 143 | 13.3 |
| C | 44 | 26 | 30 | 260 | 450 | $3.7 \times 10^5$ | 156 | |
| D | 30 | 30 | 40 | 320 | 460 | $4.3 \times 10^5$ | 166 | 14.0 |
| E | 15 | 34 | 51 | 240 | 440 | $6.1 \times 10^6$ | 159 | |
| F | 25 | 15 | 60 | 200 | 460 | $9.4 \times 10^6$ | 235 | 14.6 |
| G | 40 | 10 | 50 | 180 | 310 | $1.6 \times 10^6$ | 228 | |
| H | 10 | 22 | 68 | 230 | 400 | $5.1 \times 10^5$ | 209 | |
| J | 35 | 20 | 45 | 240 | 390 | $8.3 \times 10^6$ | 201 | |

| $WO_3$ | $WO_3$ | $P_2O_5$ | $Ag_2O$ | | | | | |
|---|---|---|---|---|---|---|---|---|
| A | 10 | 35 | 55 | 200 | 360 | $6.3 \times 10^6$ | 188 | |
| B | 15 | 22 | 63 | 250 | 400 | $3.0 \times 10^4$ | 256 | |
| C | 20 | 30 | 50 | 240 | 400 | $5.6 \times 10^5$ | 206 | |
| D | 30 | 20 | 50 | 380 | 560 | $2.9 \times 10^5$ | 203 | |
| E | 30 | 30 | 40 | 330 | 580 | $3.6 \times 10^6$ | 178 | |
| F | 45 | 25 | 30 | 430 | 670 | $1.5 \times 10^7$ | 135 | |
| G | 57 | 15 | 28 | 530 | 740 | $7.8 \times 10^7$ | 130 | 18.3 |

TABLE 2

| Glass $TeO_2$ | Composition, wt. percent | | | $T_E$, ° C. | $T_S$, ° C. | $\rho$ | $\alpha \times 10^7$ | $\epsilon$ |
|---|---|---|---|---|---|---|---|---|
| | $TeO_2$ | $P_2O_5$ | $Ag_2O$ | | | | | |
| A | 30 | 35 | 35 | 280 | 470 | $1.4 \times 10^7$ | 168 | |
| B | 47 | 26 | 27 | 280 | 470 | $1.0 \times 10^{10}$ | 210 | |
| C | 65 | 15 | 20 | 310 | 480 | $3.5 \times 10^{11}$ | 186 | 20.4 |
| D | 52 | 11 | 37 | 250 | 390 | $5.5 \times 10^8$ | 247 | 19.4 |
| E | 30 | 15 | 55 | 200 | 360 | $2.1 \times 10^5$ | 246 | |
| F | 15 | 20 | 65 | 190 | 420 | $1.8 \times 10^5$ | 262 | |
| G | 29 | 26 | 45 | 250 | 430 | $9.7 \times 10^5$ | 205 | |

| $U_3O_8$ | $U_3O_8$ | $P_2O_5$ | $Ag_2O$ | | | | | |
|---|---|---|---|---|---|---|---|---|
| A | 20 | 40 | 40 | 240 | 450 | $3.0 \times 10^7$ | 206 | |
| B | 28 | 25 | 47 | 310 | 470 | $9.1 \times 10^5$ | 199 | |
| C | 35 | 32 | 33 | 400 | 630 | $1.7 \times 10^8$ | 162 | |
| D | 50 | 25 | 25 | 440 | 730 | $5.1 \times 10^8$ | 151 | 18.8 |

| $Bi_2O_3$ | $Bi_2O_3$ | $P_2O_5$ | $Ag_2O$ | | | | | |
|---|---|---|---|---|---|---|---|---|
| A | 15 | 30 | 55 | 190 | 400 | $2.9 \times 10^6$ | 229 | 20.5 |
| B | 20 | 40 | 40 | 250 | 440 | $3.8 \times 10^7$ | 192 | |
| C | 30 | 32 | 38 | 280 | 570 | $1.1 \times 10^8$ | 184 | 15.1 |
| D | 45 | 35 | 20 | 340 | 620 | $2.7 \times 10^{10}$ | 150 | |

TABLE 3

| Glass $Sb_2O_4$ | Composition, wt. percent | | | $T_E$, ° C. | $T_S$, ° C. | $\rho$ | $\alpha \times 10^7$ | $\epsilon$ |
|---|---|---|---|---|---|---|---|---|
| | $Sb_2O_4$ | $P_2O_5$ | $Ag_2O$ | | | | | |
| A | 15 | 35 | 50 | 280 | 480 | $1.2 \times 10^7$ | 202 | |
| B | 30 | 30 | 40 | 310 | 640 | $5.3 \times 10^7$ | 190 | |
| C | 38 | 32 | 30 | 350 | 680 | $1.0 \times 10^9$ | 178 | |
| D | 45 | 35 | 20 | 350 | 740 | $4.8 \times 10^{10}$ | 171 | 17.5 |

| $Mn_2O_7$ | $Mn_2O_7$ | $P_2O_5$ | $Ag_2O$ | | | | | |
|---|---|---|---|---|---|---|---|---|
| D | 20 | 50 | 30 | 370 | 590 | $1.7 \times 10^{12}$ | 137 | |

| $V_2O_5$ | $V_2O_5$ | $As_2O_3$ | $Ag_2O$ | | | | | |
|---|---|---|---|---|---|---|---|---|
| A | 20 | 40 | 40 | | 520 | | | |
| B | 30 | 30 | 40 | 300 | 530 | $1.6 \times 10^7$ | 181 | |
| C | 60 | 20 | 20 | 260 | 570 | $1.5 \times 10^5$ | 164 | |
| D | 50 | 15 | 35 | 240 | 510 | $1.9 \times 10^6$ | 197 | 12.0 |
| E | 35 | 20 | 45 | 220 | 390 | $1.3 \times 10^8$ | 186 | |
| F | 30 | 15 | 55 | 190 | 420 | $8.8 \times 10^5$ | 246 | |
| G | 17 | 23 | 60 | 220 | 510 | $2.8 \times 10^5$ | 261 | 10.6 |
| H | 10 | 30 | 60 | 210 | 400 | $1.6 \times 10^6$ | 265 | |

| $WO_3$ | $WO_3$ | $As_2O_3$ | $Ag_2O$ | | | | | |
|---|---|---|---|---|---|---|---|---|
| A | 10 | 35 | 55 | 200 | 370 | $2.3 \times 10^6$ | 262 | 16.5 |
| B | 20 | 25 | 55 | 240 | 370 | $4.8 \times 10^5$ | 224 | |
| C | 35 | 20 | 45 | 330 | 480 | $1.3 \times 10^5$ | 193 | |
| D | 50 | 20 | 30 | 400 | 550 | $.21 \times 10^7$ | 159 | |
| E | 45 | 20 | 35 | 400 | 550 | $8.6 \times 10^5$ | 165 | |

TABLE 4

| Glass MoO$_3$ | Composition, wt. percent | | | $T_E$, °C. | $T_S$, °C. | $p$ | $\alpha \times 10^7$ | $\epsilon$ |
|---|---|---|---|---|---|---|---|---|
| | MoO$_3$ | As$_2$O$_3$ | Ag$_2$O | | | | | |
| A | 10 | 30 | 60 | 290 | 430 | 4.0×10$^4$ | 255 | |
| B | 35 | 20 | 45 | 310 | 430 | 1.5×10$^7$ | 196 | |
| C | 50 | 20 | 30 | 320 | 460 | 3.2×10$^8$ | 208 | 16.5 |
| D | 60 | 15 | 25 | 310 | 540 | 8.7×10$^9$ | 197 | 15.3 |
| E | 45 | 20 | 35 | 400 | 550 | 8.6×10$^6$ | 165 | |
| TeO$_2$ | TeO$_2$ | As$_2$O$_3$ | Ag$_2$O | | | | | |
| B | 40 | 30 | 30 | 250 | 370 | 3.3×10$^8$ | 204 | 22.2 |
| F | 30 | 20 | 50 | 240 | 360 | 1.6×10$^7$ | 227 | |
| U$_3$O$_8$ | U$_3$O$_8$ | As$_2$O$_3$ | Ag$_2$O | | | | | |
| B | 28 | 35 | 37 | 330 | 490 | 4.0×10$^7$ | 196 | 14.5 |
| V$_2$O$_5$ | V$_2$O$_5$ | TeO$_2$ | Ag$_2$O | | | | | |
| A | 46 | 27 | 27 | 210 | 470 | 2.0×10$^7$ | 1 99 | 18.8 |
| B | 35 | 20 | 45 | 180 | 360 | 1.5×10$^7$ | 215 | |
| C | 20 | 40 | 40 | 170 | 330 | 8.3×10$^8$ | 298 | |
| D | 15 | 60 | 25 | | 360 | 3.1×10$^{10}$ | | |
| Bi$_2$O$_3$ | Bi$_2$O$_3$ | B$_2$O$_3$ | Ag$_2$O | | | | | |
| B | 20 | 40 | 40 | 400 | 560 | 2.7×10$^{10}$ | 125 | |
| D | 40 | 30 | 30 | 390 | 550 | 2.7×10$^{10}$ | 130 | 10.7 |
| E | 60 | 20 | 20 | 380 | 520 | 3.5×10$^{10}$ | 136 | |

TABLE 5

| Glass GeO$_2$ | Composition, wt. percent | | | $T_E$, °C. | $T_S$, °C. | $p$ | $\alpha \times 10^7$ | $\epsilon$ |
|---|---|---|---|---|---|---|---|---|
| | GeO$_2$ | B$_2$O$_3$ | Ag$_2$O | | | | | |
| A | 20 | 40 | 40 | 450 | 640 | 6.5×10$^9$ | 115 | |
| B | 30 | 35 | 35 | 450 | 680 | 1.3×10$^{10}$ | 108 | 7.0 |
| TeO$_2$ | TeO$_2$ | B$_2$O$_3$ | Ag$_2$O | | | | | |
| C | 40 | 30 | 30 | 350 | 500 | 5.7×10$^{10}$ | 171 | 10.9 |
| E | 20 | 25 | 55 | 340 | 480 | 8.0×10$^6$ | 177 | 13.1 |
| F | 32 | 34 | 34 | 350 | 500 | 5.3×10$^9$ | 164 | |
| Mn$_2$O$_7$ | Mn$_2$O$_7$ | B$_2$O$_3$ | Ag$_2$O | | | | | |
| B | 15 | 48 | 37 | 480 | 620 | 3.4×10$^{10}$ | 109 | 9.0 |
| P$_2$O$_5$ | P$_2$O$_5$ | B$_2$O$_3$ | Ag$_2$O | | | | | |
| A | 15 | 25 | 60 | 400 | 560 | 3.1×10$^7$ | 161 | 8.1 |

Batch materials used to form the compositions of the present invention can vary widely with the exception that silver nitrate, AgNO$_3$, is the preferred source of silver. The foregoing examples show illustrative batch materials and equivalent components will be apparent to those having ordinary skill in the art.

What is claimed is:

1. A surface having sealed thereto a glass composition comprising as the essential ingredients the following components, expressed in weight percent of the total oxides in the compositions, selected from the group consisting of:

(A) silver oxide 20–70%, 10 to 70% of an oxide of a transition metal selected from the group consisting of vanadium, tungsten, uranium, and manganese and 10 to 70% of an oxide of a metalloid selected from the group consisting of boron, phosphorous, germanium, arsenic, antimony, bismuth and tellurium;

(B) silver oxide 20–70% and 30 to 80% of a two-component mixture of oxides of a metalloid selected from the group consisting of boron, phosphorous, germanium, arsenic, antimony, bismuth and tellurium;

(C) silver oxide 20–70%, 10 to 70% of molybdenum oxide and 10 to 70% of an oxide of a metalloid selected from the group consisting of boron, germanium, arsenic, antimony, bismuth and tellurium.

2. A laminated article formed of two metal lamina, sealed together with a glass composition comprising as the essential ingredients the following components, expressed in weight percent of the total oxides in the compositions, selected from the group consisting of:

(A) silver oxide 20–70%, 10 to 70% of an oxide of a metal selected from the group consisting of vanadium, tungsten, uranium, and manganese and 10 to 70% of an oxide of a metalloid selected from the group consisting of boron, phosphorous, germanium, arsenic, antimony, bismuth and tellurium;

(B) silver oxide 20–70% and 30 to 80% of a two-component mixture of oxides of a metalloid selected from the group consisting of boron, phosphorous, germanium, arsenic, antimony, bismuth and tellurium;

(C) silver oxide 20–70%, 10 to 70% of molybdenum oxide and 10 to 70% of an oxide of a metalloid selected from the group consisting of boron, germanium, arsenic, antimony, bismuth and tellurium.

References Cited

UNITED STATES PATENTS

| 3,518,209 | 6/1970 | Provance | 106—47 R |
| 3,215,544 | 11/1965 | O'Connell et al. | 106—47 R |
| 3,454,408 | 7/1969 | Busdiecker | 106—47 R |

DANIEL J. FRITSCH, Primary Examiner

U.S. Cl. X.R.

106—47R; 117—129, 169 R; 156—89; 161—182, 192, 196, 225

UNITED STATES PATENT OFFICE
CERTIFICATE OF CORRECTION

PATENT NO. : 3,798,114
DATED : March 19, 1974
INVENTOR(S) : Theodor L. Chvatal

It is certified that error appears in the above-identified patent and that said Letters Patent are hereby corrected as shown below:

Col. 3, line 59, "$AsO_3$" should be --$As_2O_3$--; Col. 4, line 6, "20.60" should be --20-60--, line 53, "$Mo_2O_7$" should be --$Mn_2O_7$--; line 66, "30-45" should be 20-45--; Col. 5, line 72, after "addition" insert --of--; line 73, change "additional" to --addition--; Col. 6, line 17, Change "ev" to --eV--; Col. 7, line 20, "mived" should be --mixed--; line 45, "72" should be --71--; Col. 8, line 58, Table 3, "350" should be --330--; Col. 8, line 68, Table 3, "$2.8X10^5$" should be --$2.8X10^6$--; Col. 8, line 74, Table 3, "$.21X10^7$" should be --$2.1X10^7$--; Col. 9, line 17, Table 4, "1 99" should be --199--; Col. 9, line 23, Table 4, "$2.7X10^{10}$" should be --$2.7X10^{11}$--; Col. 9, line 24, Table 4, "$3.5X10^{10}$" should be --$3.5X10^{11}$--; Col. 10, line 25, after "a" insert --transition--.

Signed and Sealed this

First Day of February 1977

[SEAL]

Attest:

RUTH C. MASON
Attesting Officer

C. MARSHALL DANN
Commissioner of Patents and Trademarks